(12) United States Patent
Kim

(10) Patent No.: US 11,655,922 B2
(45) Date of Patent: May 23, 2023

(54) METHOD FOR ASSEMBLING A TUBE AND A FITTING BODY

(71) Applicant: Brian Kim, Denton, TX (US)

(72) Inventor: Brian Kim, Denton, TX (US)

( * ) Notice: Subject to any disclaimer, the term of this patent is extended or adjusted under 35 U.S.C. 154(b) by 141 days.

(21) Appl. No.: 17/187,064

(22) Filed: Feb. 26, 2021

(65) Prior Publication Data

US 2021/0180731 A1 Jun. 17, 2021

Related U.S. Application Data

(62) Division of application No. 15/407,068, filed on Jan. 16, 2017, now Pat. No. 10,989,339.

(51) Int. Cl.
*F16L 19/065* (2006.01)

(52) U.S. Cl.
CPC ......... *F16L 19/065* (2013.01); *F16L 2201/10* (2013.01); *Y10T 29/49826* (2015.01)

(58) Field of Classification Search
CPC ............... F16L 19/065; F16L 2201/10
USPC ............... 285/23, 93, 343, 385, 389
See application file for complete search history.

(56) References Cited

U.S. PATENT DOCUMENTS

2006/0237962 A1* 10/2006 Anderson ............. F16L 19/103
285/23

* cited by examiner

*Primary Examiner* — Zachary T Dragicevich
(74) *Attorney, Agent, or Firm* — Sul Lee

(57) ABSTRACT

A method for connecting tubes includes fastening a position locator to an outer surface of a tube at a predetermined depth from a first end of a tube such that at least one ferrule abuts a flange of the position locator between the first end of the tube and the position locator. A tube connector assembly is formed by introducing a compression nut such that an inner wall of the compression nut surrounds the position locator and the at least one ferrule. A fitting body is introduced via the first end of the tube. The tube connector assembly is fastened to the fitting body using a first threading on the inner wall of the compression nut and a second threading on an outer wall of the fitting body such that the at least one ferrule is between the compression nut and the fitting body.

6 Claims, 17 Drawing Sheets

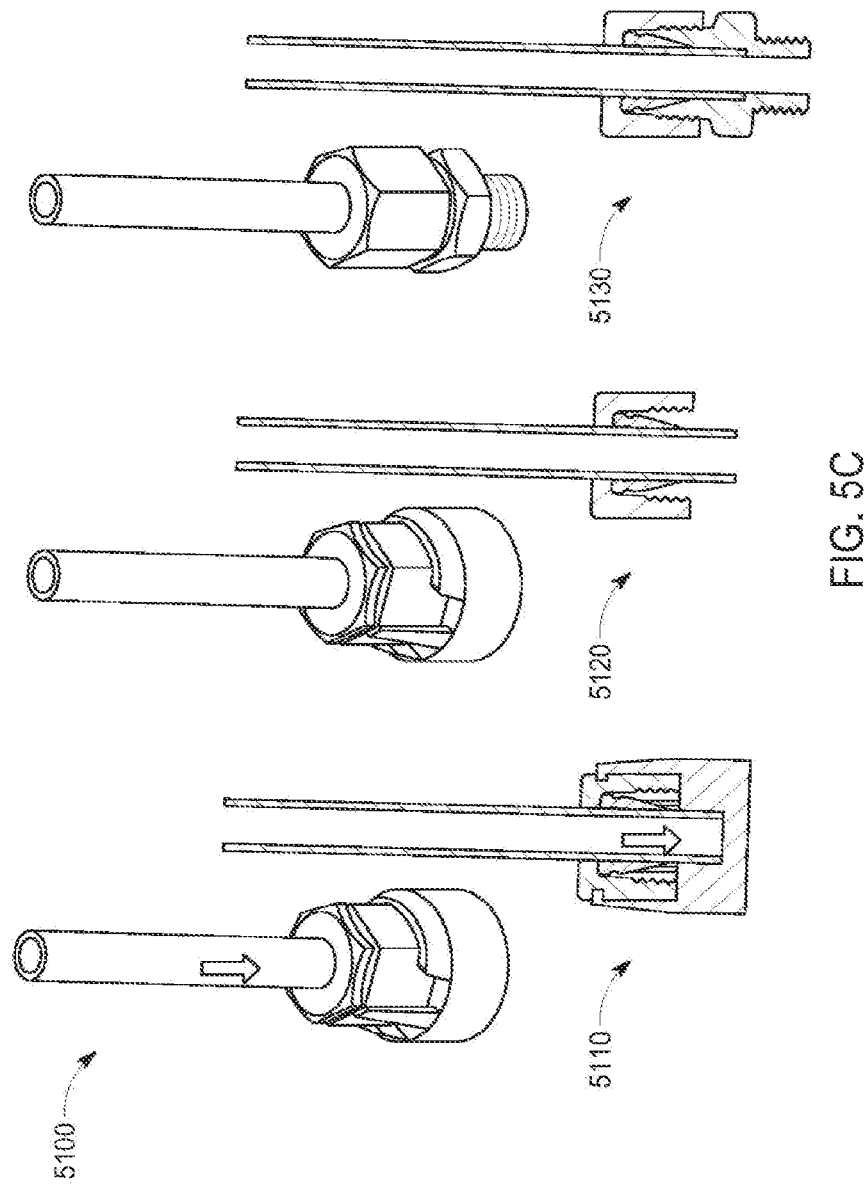

METHOD FOR ASSEMBLING A TUBE AND A FITTING BODY

CROSS-REFERENCE TO RELATED APPLICATIONS

This application is a divisional of U.S. patent application Ser. No. 15/407,068 filed on Jan. 16, 2017, now U.S. Pat. No. 10,989,339, issued Apr. 27, 2021. The above identified application is herein incorporated by reference in its entirety.

TECHNICAL FIELD

The present disclosure relates generally to tube fittings in gas and plumbing and more specifically to an assembly of a tube and a fitting body and a method thereof.

BACKGROUND ART

A tube in gas and plumbing may be assembled with a valve in order to receive or supply a fluid or gas to the valve or may be assembled with another tube to provide an extension in overall length of the gas supply or plumbing. A typical method of making such an assembly involves assembling the tube with a fitting body using a tube connector arrangement and then assembling the assembly of the tube and the fitting body to the valve or another assembly of the tube and the fitting body.

The tube connector arrangement typically includes a pair of ferules and a compression nut. The purpose of the pair of ferrules is to provide leak proof metal to metal assembly between the tube and the fitting body, while the compression nut serves the purpose of fastening the tube with the fitting body and holding the pair of ferrules in their places. FIG. 1A illustrates an exploded view of a tube connector arrangement 130 according to a prior art 100. The tube 110 has a first tube end 1102 and a second tube end 1104. Further, the fitting body 120 has a first fitting body end 1202 and a second fitting body end 1204. The fitting body 120 needs to be assembled at the first tube end 1102. Further the tube connector arrangement 130 includes a first ferrule 1302, a second ferrule 1304 and a compression nut 1306. The first ferrule 1302, the second ferrule 1304 and the compression nut 1306 have been coaxially provided at an outer tube surface 1106 of the tube 110. FIG. 1B illustrates a sectional view of the tube connector arrangement 130 according to the prior art 100. It can be seen from the FIG. 1B that the first ferrule 1302 and the second ferrule 1304 provide a sealing effect during assembly of the tube 110 and the fitting body 120. While the compression nut 1306 is fastened to the fitting body 120 and holds the first ferrule 1302 and the second ferrule 1304 in their places.

However, positioning of the first ferrule 1302 and the second ferrule 1304 is critical while making the assembly between the tube 110 and the fitting body 120. The first and the second ferrules 1302 and 1304 need to be positioned at an accurate depth with respect to the end 1102 of the tube 110. If the depth is too small there will not be enough area of the outer tube surface 1106 available to ensure that the first and the second ferrules 1302 and 1304 provide a proper sealing effect and that undue stresses are not generated at the first tube end 1102 due to compression action of the compression nut 1306. This leads to leaky assembly between the tube 110 and the fitting body 120 and/or damaged first tube end 1102. If the depth is too large, there will not be sufficient mating between the compression nut 1306 and the fitting body 120 to ensure a tight assembly. However, during fastening of the compression nut 1306 to the fitting body 120, the tube 110 is generally free to slide, making it difficult to accurately position the first and the second ferrules 1302 and 1304.

In the prior art, there are some solutions available to ensure that this positioning is accurately done. In one solution, a depth marking tool may be used to make a marking on the tube, corresponding to the position of the first ferrule 1302 and the second ferrule 1304 and the marking may then be referenced while the assembly of the tube 110 with the fitting body 120. However, the position with respect to the marking is difficult to maintain while making the assembly, as the tube is likely to slide up or down or sideways depending upon the orientation of the assembly.

Another solution included the use of a pre-swaging tool, that allows the first ferrule 1302 and the second ferrule 1304 to be pre-swaged to the tube 110, before the tube 110 is introduced to the fitting body 120. However, even in this case, there is disadvantage of having to perform an additional pre-swaging step. Especially, in field applications, where there is a need to make rapid assemblies on a large scale, the additional step of pre-swaging may cause significant delays and losses in terms of man-hours. Another disadvantage is that, once the first ferrule 1302 and the second ferrule 1304 have been pre-swaged to the tube 110, there is always of a possibility of the first and the second ferrules 1302, 1304 to get disturbed while removing the tube 110 from the pre-swaging tool or while transferring the tube 110 to the fitting body 120.

In light of the discussion above, there is clearly a need for an improved tube connector arrangement and a method for assembling a tube that overcome one or more of the above mentioned deficiencies.

SUMMARY

According to a first aspect of the present disclosure, there is provided a method comprising fastening a position locator to an outer surface of a tube at a predetermined depth from a first end of a tube such that at least one ferrule abuts a flange of the position locator between the first end of the tube and the position locator, forming a tube connector assembly by introducing a compression nut such that an inner wall of the compression nut surrounds the position locator and the at least one ferrule, introducing a fitting body via the first end of the tube and fastening the tube connector assembly to the fitting body using a first threading on the inner wall of the compression nut and a second threading on an outer wall of the fitting body such that the at least one ferrule is between the compression nut and the fitting body. This way the position locator can be used to accurately position the at least one ferrule at the predetermined depth. The position locator prevents the at least one ferrule from getting displaced along the outer surface of the tube, and especially prevents the at least one ferrule from slipping in an opposite direction to a direction of the fitting body.

In accordance with an embodiment of the present disclosure, the tube connector assembly is formed before the position locator is fastened to the outer surface. This helps in deciding the number and types of ferrules to be used in the tube connector assembly, depending upon the application and other factors such as safety, service life, reliability and durability desired for the tube connector assembly.

In accordance with an embodiment of the present disclosure, fastening the position locator to the outer surface of the tube comprises fastening the tube connector assembly such that the compression nut is temporarily fastened to a hollowed out portion of an assembly jig, the assembly jig comprising the hollowed out portion at one end that is wide enough to allow the tube to pass through and a shoulder portion at an opposite end that prevents the tube from passing through, inserting the first end of the tube into the tube connector assembly until the first end of the tube abuts the shoulder portion of the assembly jig and unfastening the assembly jig from the tube connector assembly. The assembly jig allows both the assembly of the tube and the tube connector assembly and also the positioning of the tube connector assembly with respect to the tube. The assembly jig further reduces number of steps required and/or parts required to assemble the tube connector assembly onto the tube.

In accordance with an embodiment of the present disclosure, when the tube connector assembly is fastened to the assembly jig, the distance between the shoulder portion of the assembly jig and the position locator is equivalent to the predetermined depth. This way an operator will not have to take special efforts to make sure that the position locator is located at the predetermined depth. In this manner, the assembly jig serves the purpose of both the assembly and the positioning of the tube connector assembly at the outer surface of the tube.

In accordance with an embodiment of the present disclosure, the assembly jig comprises a bolt type assembly jig, wherein the outer surface of the hollowed out portion is threaded to be temporarily fastened to the first threading on the inner wall of the compression nut. The bolt type assembly jigs are easy to use because of the threads present on the outer surface of the hollowed out portion. The compression nut can be easily fastened and unfastened from the outer surface of the hollowed out portion, just by using a simple tool such as a spanner. The threads provide a good compromise between strength of the fastening and convenience of use.

In accordance with an embodiment of the present disclosure, the assembly jig comprises a binder type assembly jig comprising a plurality of binders such that unfastening the assembly jig from the tube connector assembly comprises pressing the tube against the shoulder of the binder type assembly jig. This makes the binder type assembly jig is even more convenient to use as compared to the bolt type assembly jig and allows quick operations in scenarios such as production lines and field scenarios having harsh conditions and/or large scale installations, where an operator does not have a lot of time for assembling the tube connector assembly with the tube.

In accordance with an embodiment, fastening the position locator to the outer surface of the tube comprises coaxially introducing the position locator to the first end of the tube, inserting the first end of the tube into an elongate portion of a position locator guide until the first end of the tube abuts a cap of the position locator guide such that the position locator is pushed along the outer surface of the tube for the length of the elongate portion, the length of the elongate portion being equivalent to the predetermined depth and removing the tube from the position locator guide. The position locator guide provides the flexibility of using the position locator with any kind and number of ferrules. Also, the position locator guide is much simpler in design and construction allowing it to be produced rather cheaply and used pretty conveniently.

According to a second aspect of the present disclosure, there is provided an assembly for connecting tubes, the assembly comprising a tube connector assembly comprising a position locator having a hollow cylindrical shape and configured to be fastened to an outer surface of a tube at a predetermined depth from a first end of the tube, the position locator comprising a hole and an inner projection projecting inward from an inner surface of the position locator, the inner projection configured to prevent sliding of the position locator in at least one direction along the outer surface of the tube, at least one ferrule having a configured to be coaxially positioned against a first side of the position locator, and a compression nut configured to be coaxially positioned against a second side of the position locator opposite to the first side of the position locator, such that an inner wall of the compression nut having a threaded portion surrounds the position locator and the at least one ferrule and an assembly guide configured to position the position locator of the tube connector assembly, the assembly guide comprising a cavity portion and a shoulder portion such that when the assembly guide is engaged with the tube connector assembly and tube is inserted into a cavity of the compression nut through the position locator until the first end of the tube abuts the shoulder portion of the assembly guide, the length from the first end of the tube to the position locator is equivalent to the predetermined depth.

In accordance with an embodiment of the present disclosure, the assembly further comprises a fitting body configure to connect tubes, the fitting body comprising an outward threaded portion at each distal end configured to be fastened to the threaded portion of the inner wall of the compression nut such that the at least one ferrule and the position locator are between the compression nut and the fitting body.

In accordance with an embodiment of the present disclosure, the assembly guide further comprises a cap at one end of the cavity portion, the cavity portion of the assembly guide having a substantially cylindrical elongated shape such that the shoulder portion is at the end of the cavity portion where the cap is located.

In accordance with an embodiment of the present disclosure, the assembly guide is a bolt type assembly jig, wherein the outer wall of the cavity portion is threaded to be temporarily fastened to the threaded portion of the compression nut.

In accordance with an embodiment of the present disclosure, the assembly guide is a binder type assembly jig comprising a plurality of binders to temporarily fasten the assembly guide to the compression nut of the tube connector assembly.

In accordance with an embodiment of the present disclosure, the position locator comprises an outer projection projecting outward from an outer surface, the outer projection configured to fasten the position locator to the at least one ferrule.

BRIEF DESCRIPTION OF THE
ACCOMPANYING DRAWINGS

So that the manner in which the above recited features of the present disclosure can be understood in detail, a more particular description of the disclosure, briefly summarized above, may have been referred by embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

These and other features, benefits, and advantages of the present disclosure will become apparent by reference to the following text figure, with like reference numbers referring to like structures across the views, wherein:

FIG. 5C illustrates a series of visual steps for connecting a tube to a fitting body using the assembly of the tube connector arrangement and the binder type assembly jig of FIG. 5A, in accordance with an embodiment of the present disclosure;

and

Figure 8:
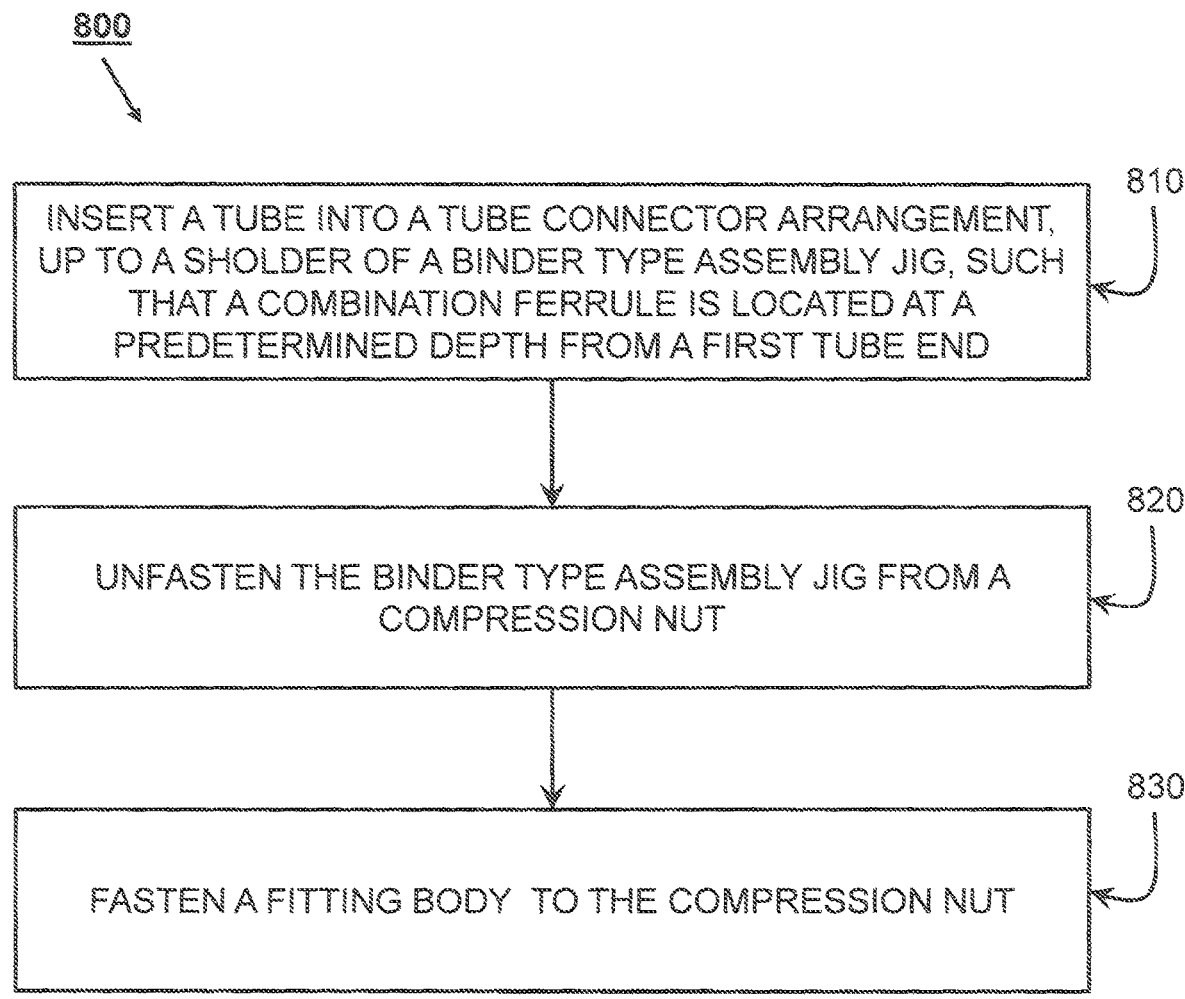

FIG. 8 illustrates a method of assembling a tube with a fitting body, using an assembly of a tube connector arrangement and a binder type assembly jig, in accordance with an embodiment of the present disclosure.

DEFINITIONS OF TERMS

The following definitions are provided as general definitions and should in no way limit the scope of the present disclosure to those terms alone but are put forth for a better understanding of the following description.

Unless defined otherwise, all technical and scientific terms used herein have the same meaning as commonly understood by those of ordinary skill in the art to which the disclosure belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present disclosure, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present disclosure, the following terms are defined below.

In the context of the specification, a "polymer material" is any naturally occurring or man-made material having long chains of organic molecules (eight or more organic molecules), with physical and chemical properties of such organic molecules giving the material its desired properties.

In the context of the specification, a "tube" is a hollow conduit meant for supply of fluids. The tube may be made up of, but not limited to, any suitable metallic material, polymer material or a composite material. Further, the tube may have a substantially circular cross section.

In the context of the specification, "temporary fastening" may be achieved by using any of the easily removable or replaceable fasteners such as, but not limited to, screws, bolts, clips, snaps and hooks etc.

In the context of the specification, "permanent fastening" may be achieved using fasteners which are relatively difficult to replace such as rivets or adhesives etc.

In the context of the specification, a "fitting body" is a hollow body member made up of metal, polymer material or a composite material. The fitting may have fastening arrangements such as threads at its two ends. Fastening arrangements allow the fitting body to act as an interface while connecting the tube to another component such as a service valve or another tube in the plumbing or gas supply. According to an embodiment, the fastening arrangements of the fitting body may have a predetermined length to correspond to a particular tube connector assembly.

In the context of the specification, a "ferrule" is a adapted to be provided coaxially at an outer tube surface of the tube. According to an embodiment, the ferrule may have a substantially conical shape and/or a substantially conical portion. In an embodiment the ferrule may have a substantially cylindrical shape with a tapered portion. Under compression, the ferrule may engage with the outer tube surface to provide a leak proof sealing between the tube and the fitting body, while assembling the tube with the fitting body.

In the context of the specification, a "compression nut" is a nut with an inner diameter being slightly greater than largest diameter of the ferrule. The compression nut is provided with threads on inner surface of the compression nut. The threads allow the nut to be fastened to the fitting body in order to compress the ferrule(s) for providing a leak proof assembly between the tube and the fitting body.

In the context of the specification, a "position locator" is a hollow cylindrical component, with a very small thickness compared to length of the tube. The position locator is adapted to be coaxially fastened with the outer tube surface of the tube, at a predetermined depth from an end of the tube. The fastening may be temporary or permanent. The position locator is adapted prevent the ferrule(s) from sliding along the tube, in a direction opposite to a direction of assembly of the tube with the fitting body.

In the context of the specification, a "position locator guide" is a component adapted to locate the position locator at a predetermined depth from an end of the tube.

DETAILED DESCRIPTION

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claim. As used throughout this description, the word "may" is used in a permissive sense (i.e. meaning having the potential to), rather than the mandatory sense, (i.e. meaning must). Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

In this disclosure, whenever a composition or an element or a group of elements is preceded with the transitional phrase "comprising", it is understood that we also contemplate the same composition, element or group of elements with transitional phrases "consisting of", "consisting", "selected from the group consisting of", "including", or "is" preceding the recitation of the composition, element or group of elements and vice versa.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure.

Figure 1A:
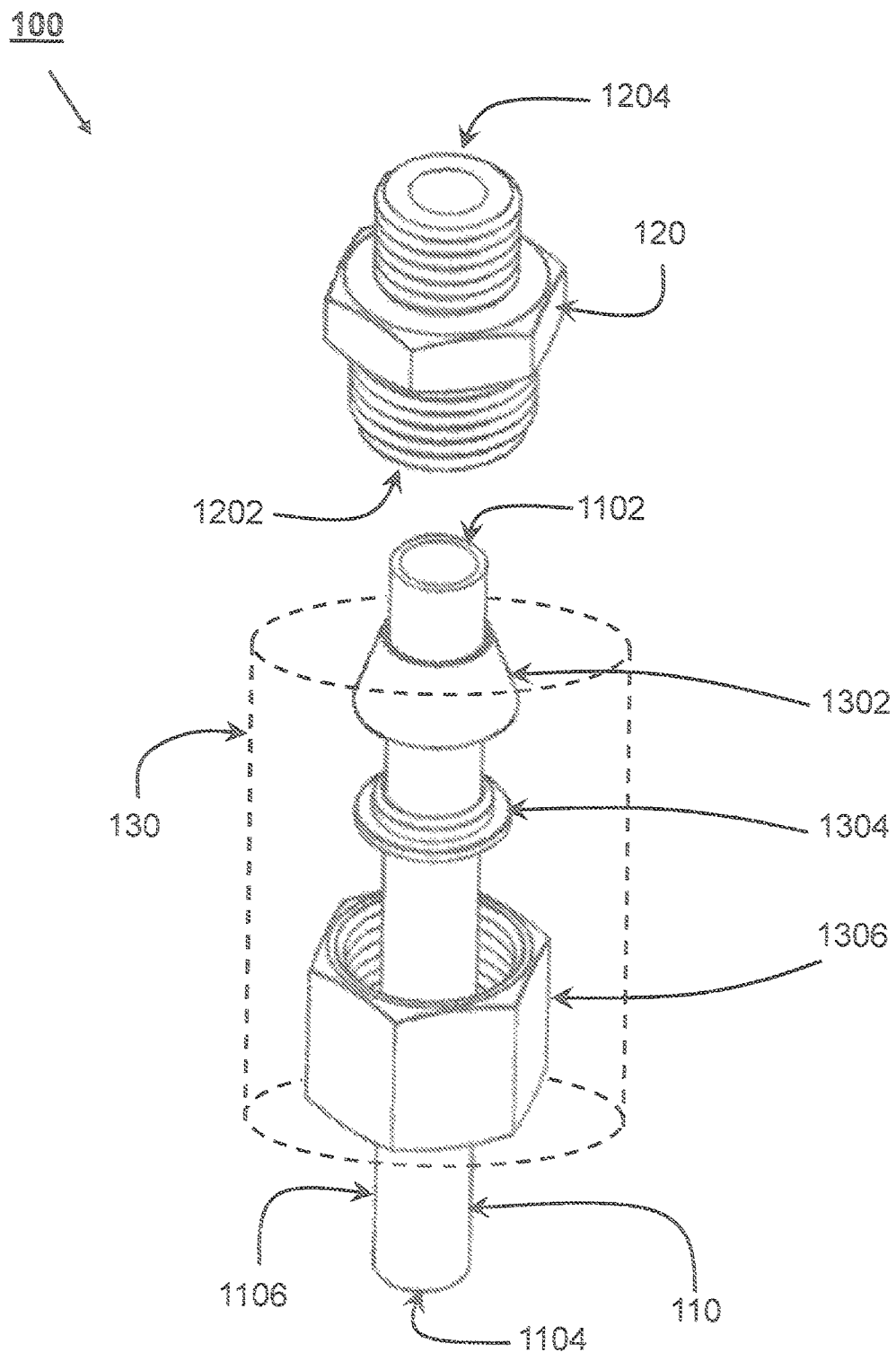
FIG. 1A illustrates an exploded view of a tube connector arrangement according to a prior art.
Figure 1B:
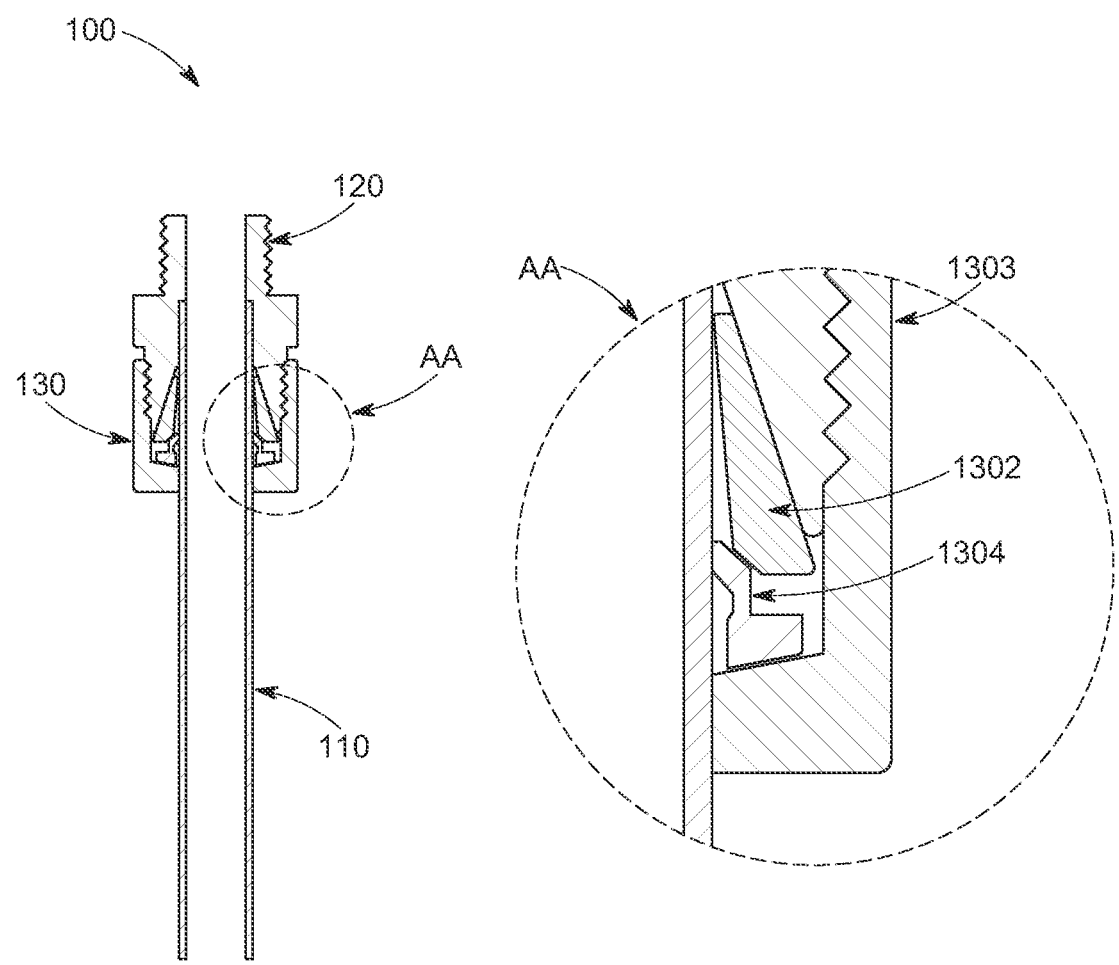
FIG. 1B illustrates a sectional view of the tube connector arrangement according to a prior art.
Figure 2A:
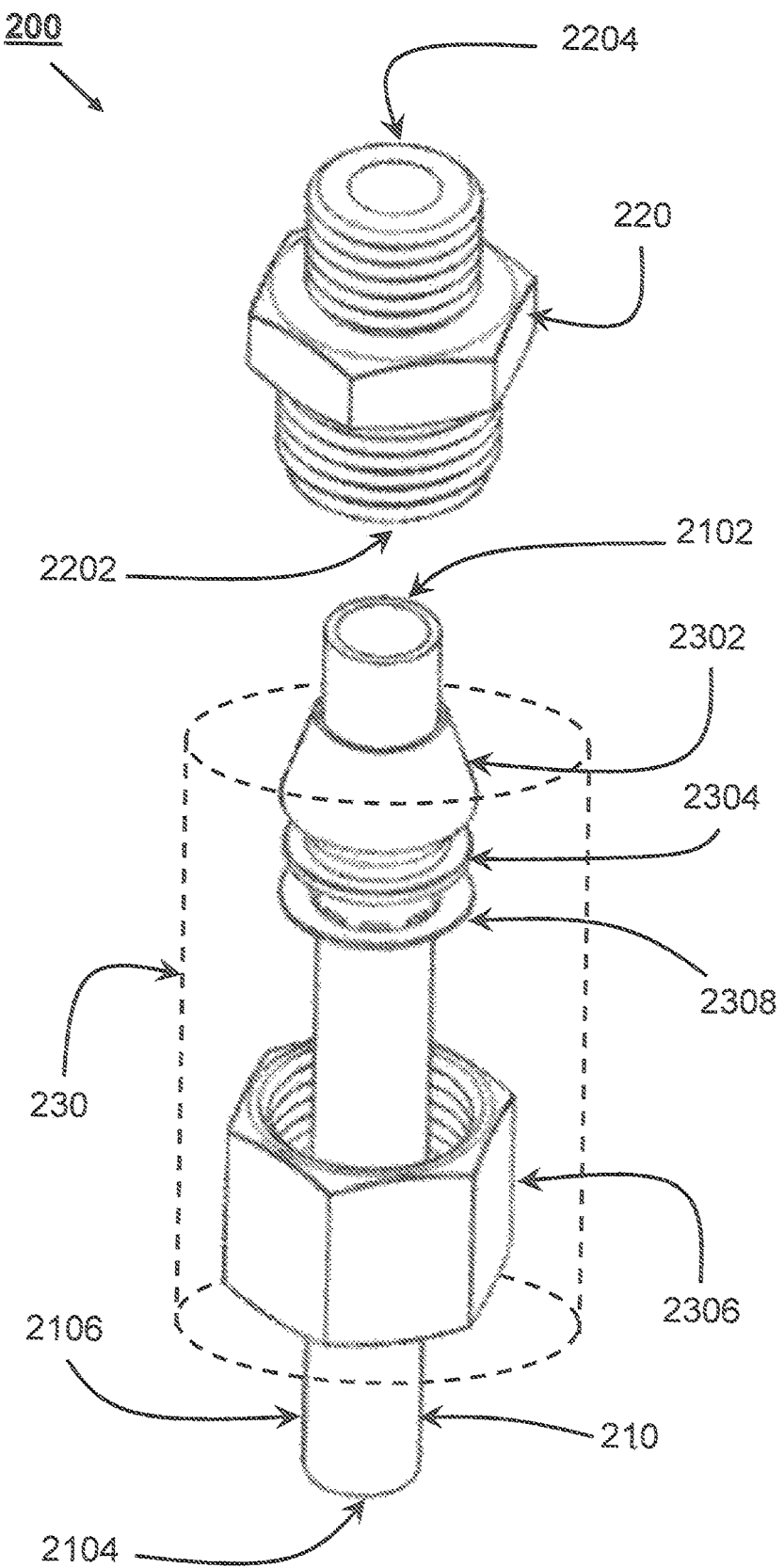
FIG. 2A illustrates an exploded view of a tube connector arrangement, in accordance with an embodiment of the present disclosure.

Referring to the drawings, the disclosure will now be described in more detail. FIG. 2A illustrates an exploded view of a tube connector arrangement 230, in accordance with an embodiment 200 of the present disclosure. The tube connector arrangement 230 is coaxially provided at the outer tube surface 2106. As shown in FIG. 2A, the tube connector arrangement 230 includes a first ferrule 2302, a second ferrule 2304, a position locator 2308 and a compression nut 2306. The position locator 2308 is adapted to either temporarily or permanently fasten to the outer tube surface 2106 of a tube 210, at a predetermined depth from the first tube end 2102.

Figure 2B:
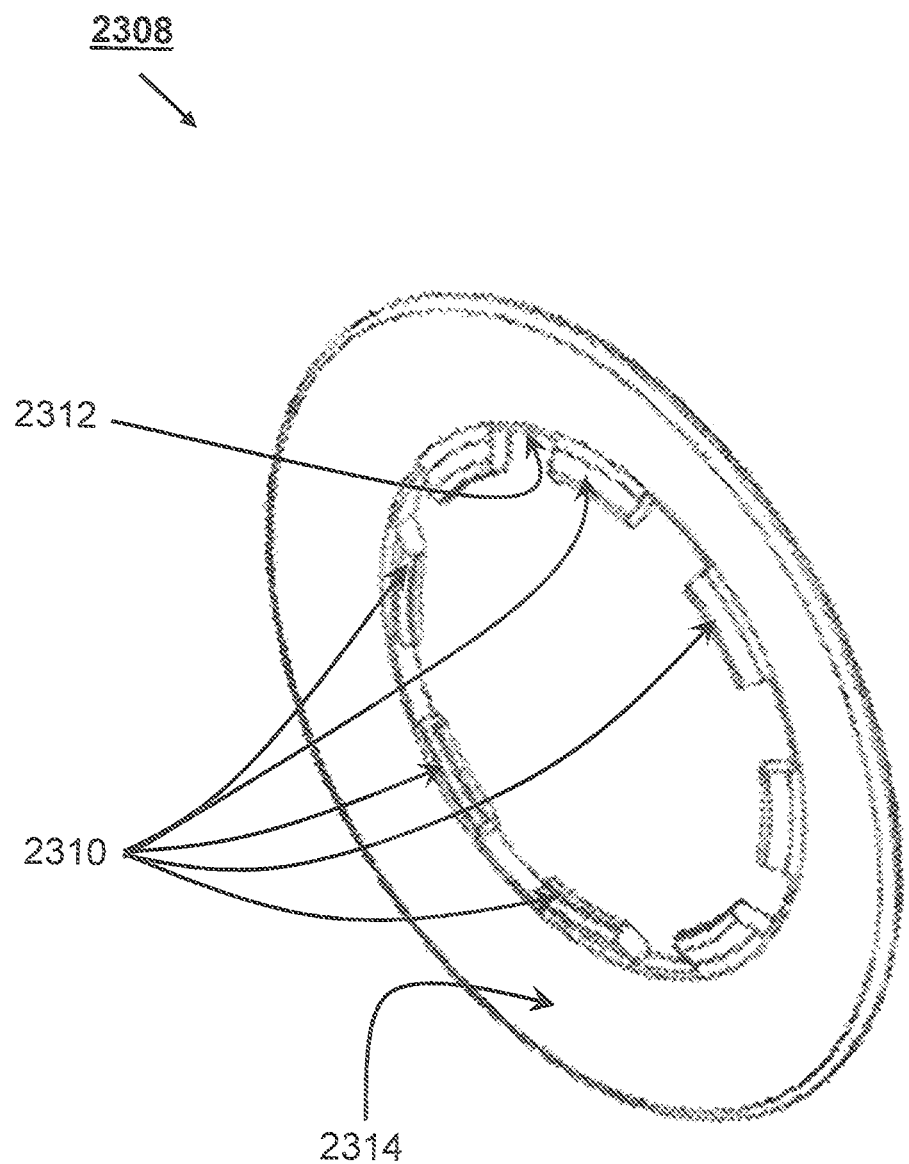
FIG. 2B illustrates a position locator for use with the tube connector arrangement of FIG. 2A, in accordance with an embodiment of the present disclosure.

FIG. 2B illustrates the position locator 2308 for use with the tube connector arrangement 230 of FIG. 2A, in accordance with an embodiment of the present disclosure. As shown in FIG. 2B, the position locator 2308 has a fastening means 2310 adapted to fasten the position locator 2308 to the outer tube surface 2106 of the tube 210. In accordance with an embodiment of the present disclosure, the fastening means 2310 includes one or more elastic projections projecting from an inner position locator surface 2312 of the position locator 2308. When the position locator 2308 is introduced to the tube 210, the one or more elastic projections engage with the outer tube surface 2106 of the tube 210. The engagement of the one or more elastic projections prevent sliding of the position locator 2308 along the outer tube surface 2106.

In another embodiment, the inner position locator surface 2312 is an expandable surface. Further, inner diameter of the position locator 2308 is smaller than diameter of the outer tube surface 2106 of the tube 210. So when, the position locator 2308 is introduced to the tube 210, the inner position locator surface 2312 is expanded to move the position locator 2308 along length of the tube 210. At the predetermined depth, the inner position locator surface 2312 is released, such that, the inner position locator surface 2312 contracts to engage with the outer tube surface 2106 of the tube 210. It would be appreciated by a person skilled in the art, that the fastening means 2310 is not limited to the embodiments discussed above but also may include any such means capable of either temporarily or permanently fastening the position locator 2308 to the outer tube surface 2106 of the tube 210. Further, the position locator 2308 has a position locator flange 2314 adapted to receive one or more of the first ferrule 2302 and the second ferrule 2304.

Figure 2C:
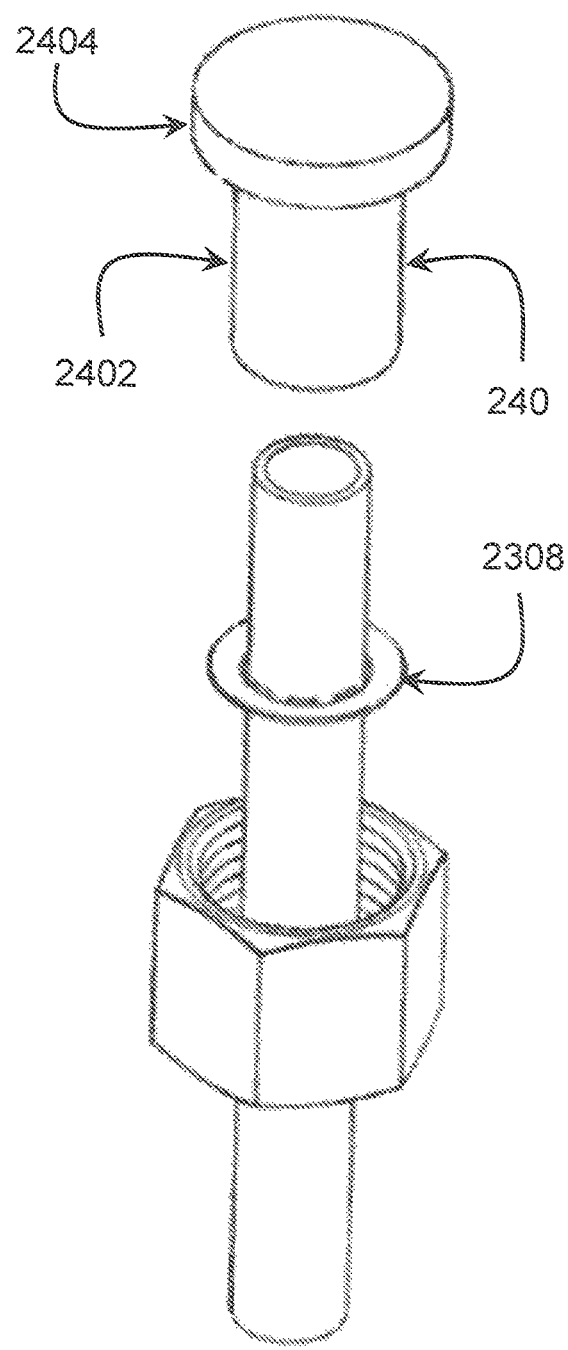
FIG. 2C illustrates a position locator guide for installation of the position locator onto a tube of the tube connector arrangement of FIG. 2A, in accordance with an embodiment of the present disclosure.

FIG. 2C illustrates a position locator guide 240 for installation of the position locator 2308 onto the tube 210 of the tube connector arrangement 230 of FIG. 2A, in accordance with an embodiment of the present disclosure. The position locator guide 240 is adapted to locate the position locator 2308 at the predetermined depth on the outer tube surface 2106 of the tube 210. As shown in FIG. 2C, the position locator guide 240 has an elongate portion 2402 and a cap 2404. The elongate portion 2402 is a hollow portion and has an inner diameter greater than the diameter of the outer tube surface 2106 of the tube 210. Further, the cap 2404 is substantially solid. The elongate portion 2402 has a length equal to the predetermined depth. In use, the position locator 2308 is first introduced coaxially to the tube 210 such that the position locator is near the first tube end 2102. The tube 210 engages with the position locator guide 240 by being inserted inside the elongate portion 2402, such that, the outer tube surface 2106 is exposed below the predetermined depth from the first tube end 2102. Further, the position locator 2308 is pushed from the end along the outer tube surface 2106 to locate/place the position locator 2308 at the predetermined depth from the first tube end 2102. Thus the position locator guide 240 allows easy location of the position locator 2308 along the outer tube surface 2106, at a predetermined depth from the first tube end 2102. Thereafter, the tube 210 is removed from the position locator guide 240.

Figure 2D:
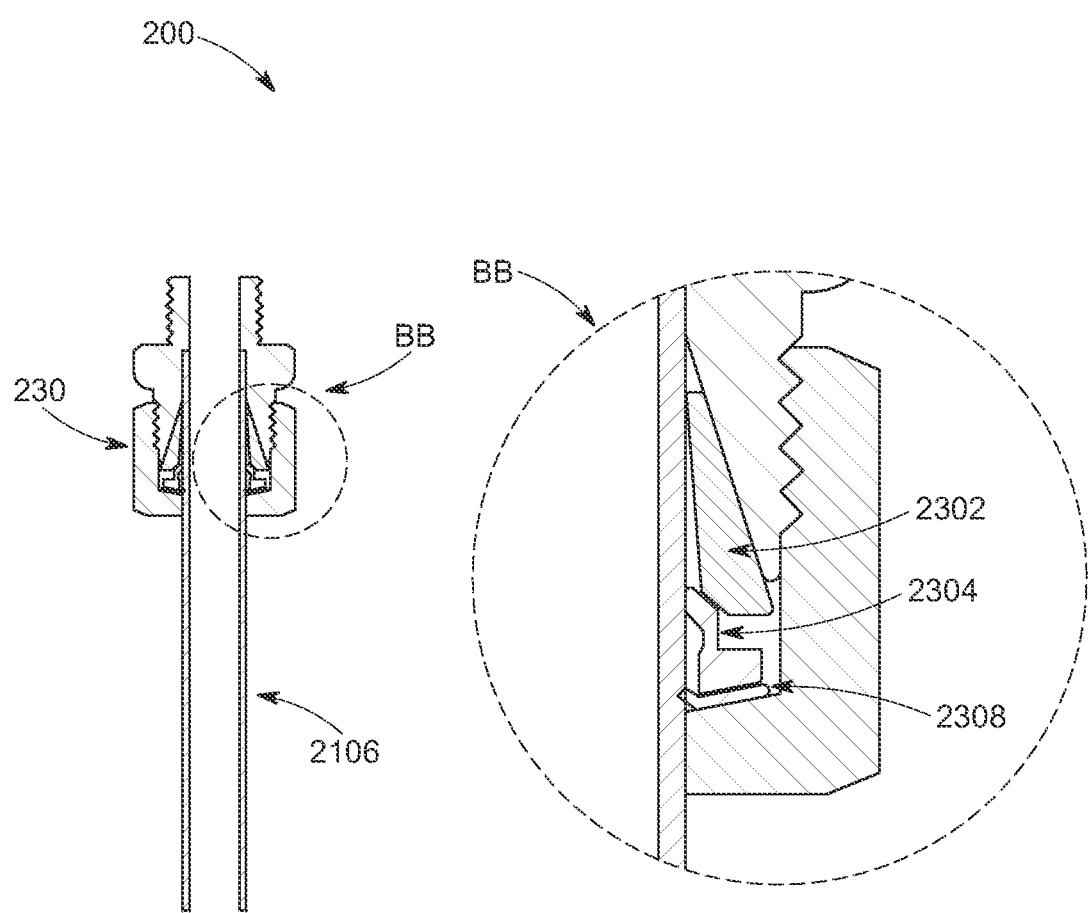
FIG. 2D illustrates a sectional view of the tube connector arrangement of FIG. 2A, in accordance with an embodiment of the present disclosure.

FIG. 2D illustrates a sectional view of the tube connector arrangement 230 of FIG. 2A, in accordance with the embodiment 200 of the present disclosure. As can be seen from FIG. 2D, the position locator 2308 is fastened to the outer tube surface 2106 and the first ferrule 2302 and the second ferrule 2304 have been received at the position locator flange 2314 (not shown in FIG. 2D). The position locator 2308 ensures that the first ferrule 2302 and the second ferrule 2304 are prevented from moving along the outer tube surface 2106, in a direction opposite to the direction of the assembly of the tube 210 with the fitting body 220.

Figure 3A:
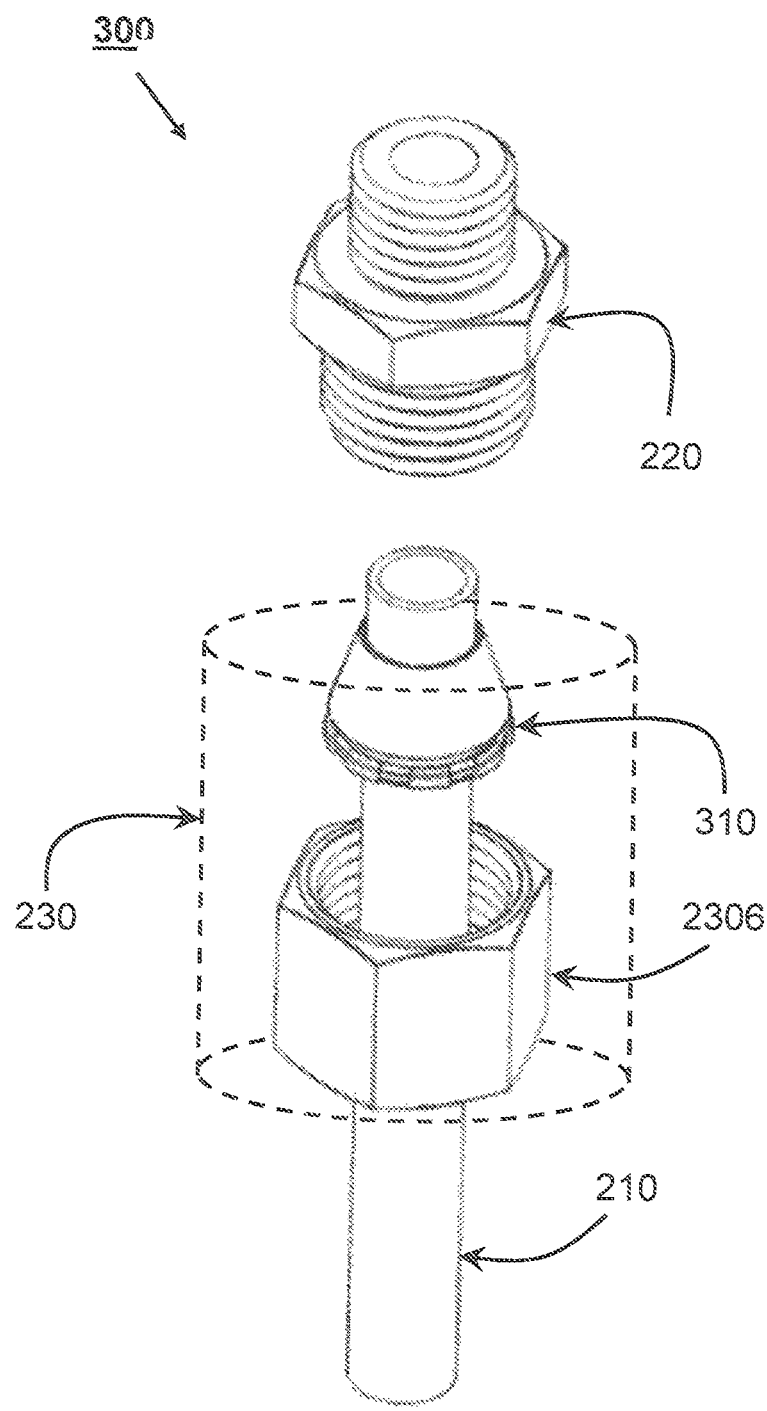
FIG. 3A illustrates an exploded view of a tube connector arrangement, in accordance with another embodiment of the present disclosure.

FIG. 3A illustrates an exploded view of the tube connector arrangement 230, in accordance with another embodiment 300 of the present disclosure. As shown in FIG. 3A, the first ferrule 2302, the second ferrule 2304 and the position locator 2308 have been replaced by a combination ferrule 310.

Figure 3B:
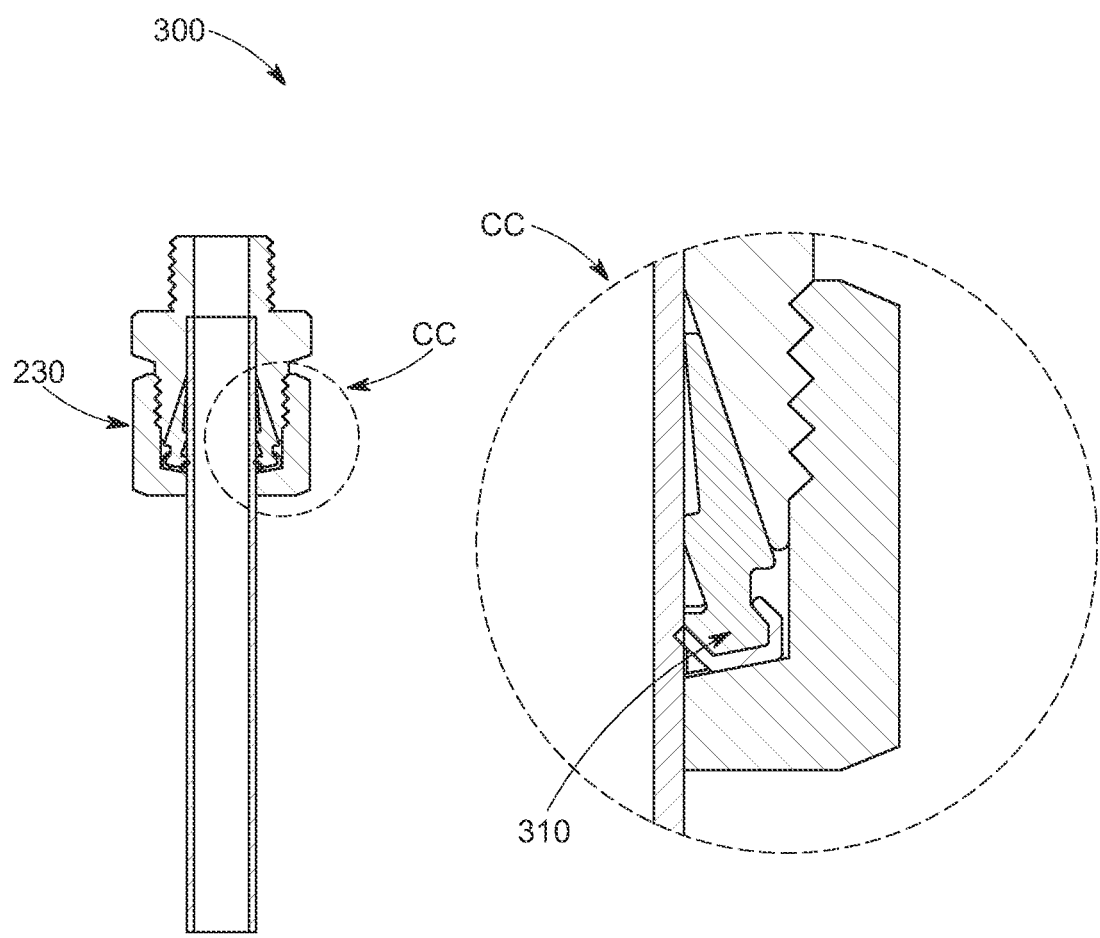
FIG. 3B illustrates a sectional view of the tube connector arrangement of FIG. 3A, in accordance with an embodiment of the present disclosure.

FIG. 3B illustrates a sectional view of the tube connector arrangement 230 of FIG. 3A, in accordance with the embodiment 300 of the present disclosure. The combination ferrule 310 is functionally equivalent to the combination of the first ferrule 2302, the second ferrule 2304 and the position locator 2308, however, total number of parts in the tube connector arrangement 210 are reduced thus resulting in reduction of production cost. This also helps during assembly of the tube 210 with the fitting body 220, as there are lesser number of parts to assemble ensuring convenience during assembly and smaller is a possibility of a part getting lost in the process.

Figure 3C:
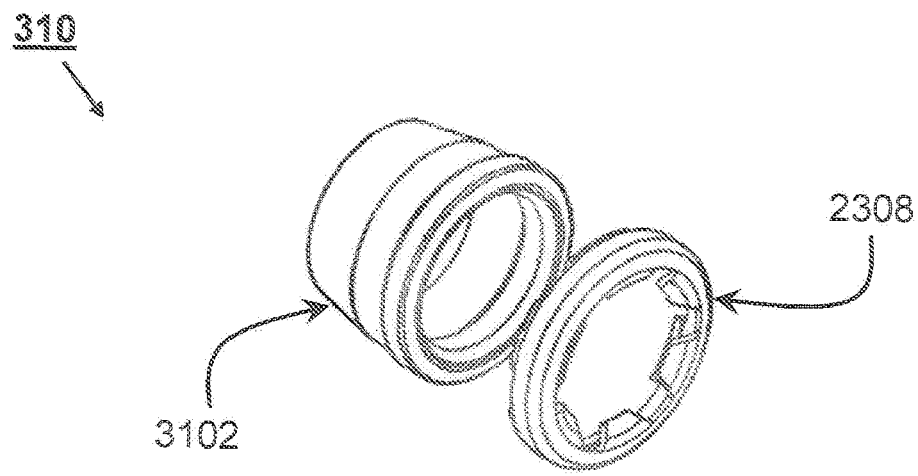
FIG. 3C illustrates an exploded view of a combination ferrule in accordance with an embodiment of the present disclosure.

FIG. 3C illustrates an exploded view of the combination ferrule 310 in accordance with an embodiment of the present disclosure. As shown in FIG. 3C, the combination ferrule 310 includes a ferrule member 3102 and the position locator 2308. Further, the combination ferrule 310 further includes a second fastening means 3104 (not shown) adapted to fasten the ferrule member 3102 with the position locator 2308.

In accordance with an embodiment, the second fastening means 3104 includes one or more second elastic projections projecting outwards from the position locator flange 2314 and adapted to elastically grip the ferrule member 3102. Correspondingly, to accommodate the second fastening means 3104, an end of the ferrule member 3102 has been shaped to be received into the one or more second elastic projections. In accordance with another embodiment, the second fastening means 3104 includes a plurality of holes provided in the position locator flange 2314, the plurality of holes being adapted to receive a plurality of threaded fasteners in order to fasten the ferrule member 3102 to the position locator 2308. Correspondingly, the second fastening means 3104 further includes a plurality of respective threaded holes provided at the end of the ferrule member 3102 in order to receive the plurality of fasteners through the position locator flange 2314.

Figure 3D:
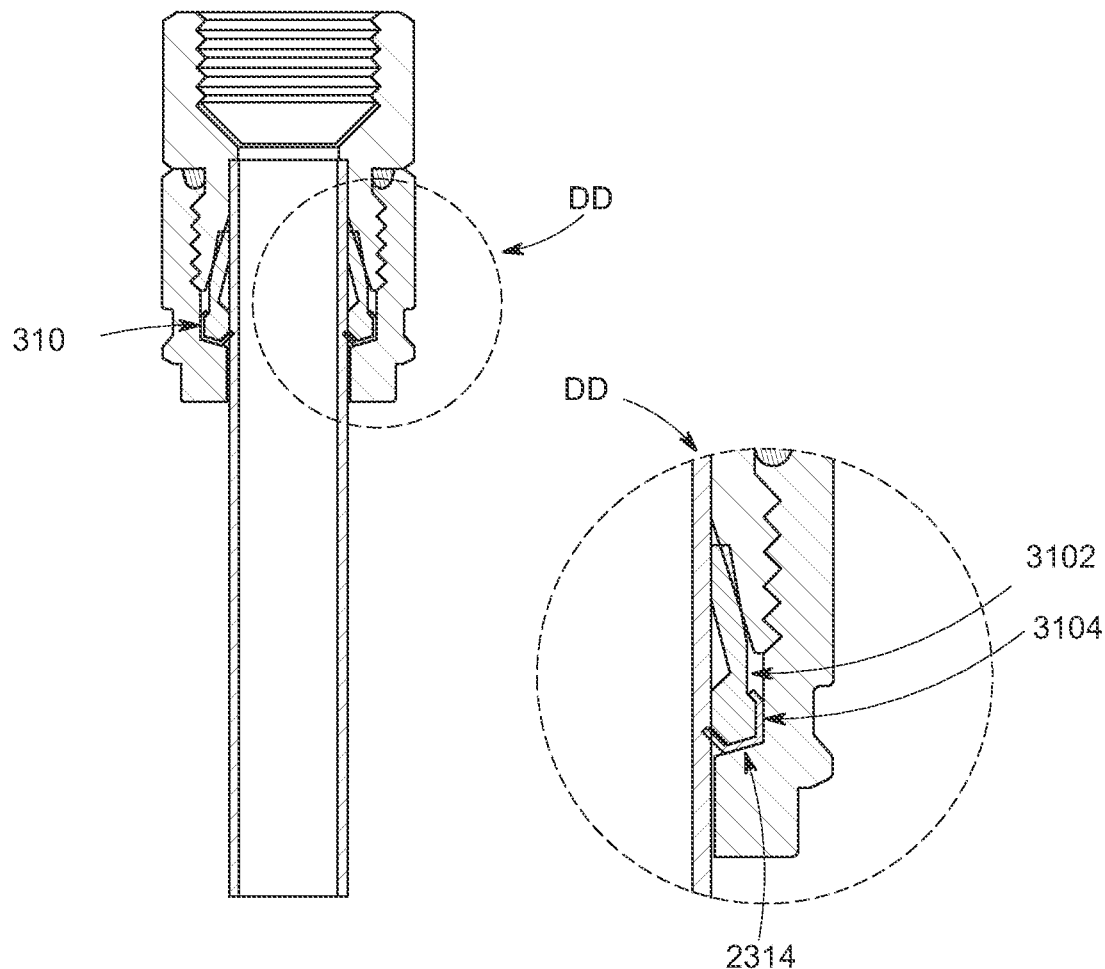
FIG. 3D illustrates press-fitting of a ferrule member and a position locator to obtain the combination ferrule of FIG. 3C, in accordance with an embodiment of the present disclosure.

FIG. 3D illustrates press-fitting of the ferrule member 3102 and the position locator 2308 to obtain the combination ferrule 310 of FIG. 3C, in accordance with an embodiment of the present disclosure. As shown in FIG. 3D, the second fastening means 3104 includes the one or more second elastic projections projecting from the position locator flange 2314 and entirely encapsulating the end of the ferrule member 3102.

Figure 3E:
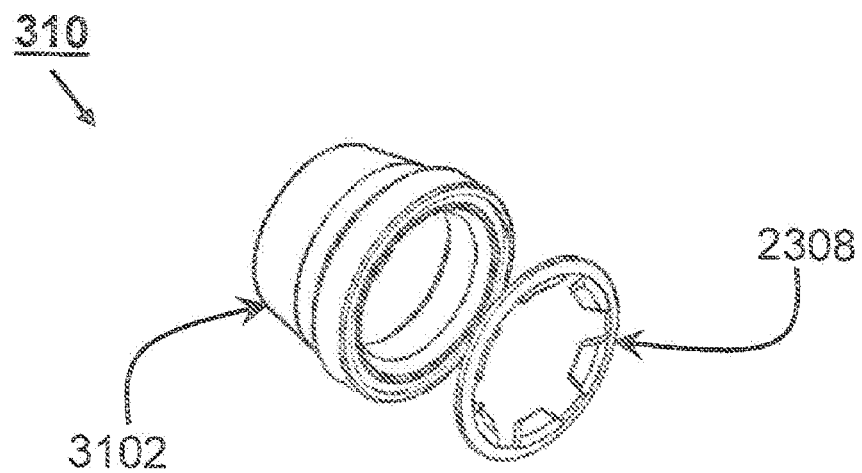
FIG. 3E illustrates an exploded view of a combination ferrule in accordance with another embodiment of the present disclosure.
Figure 3F:
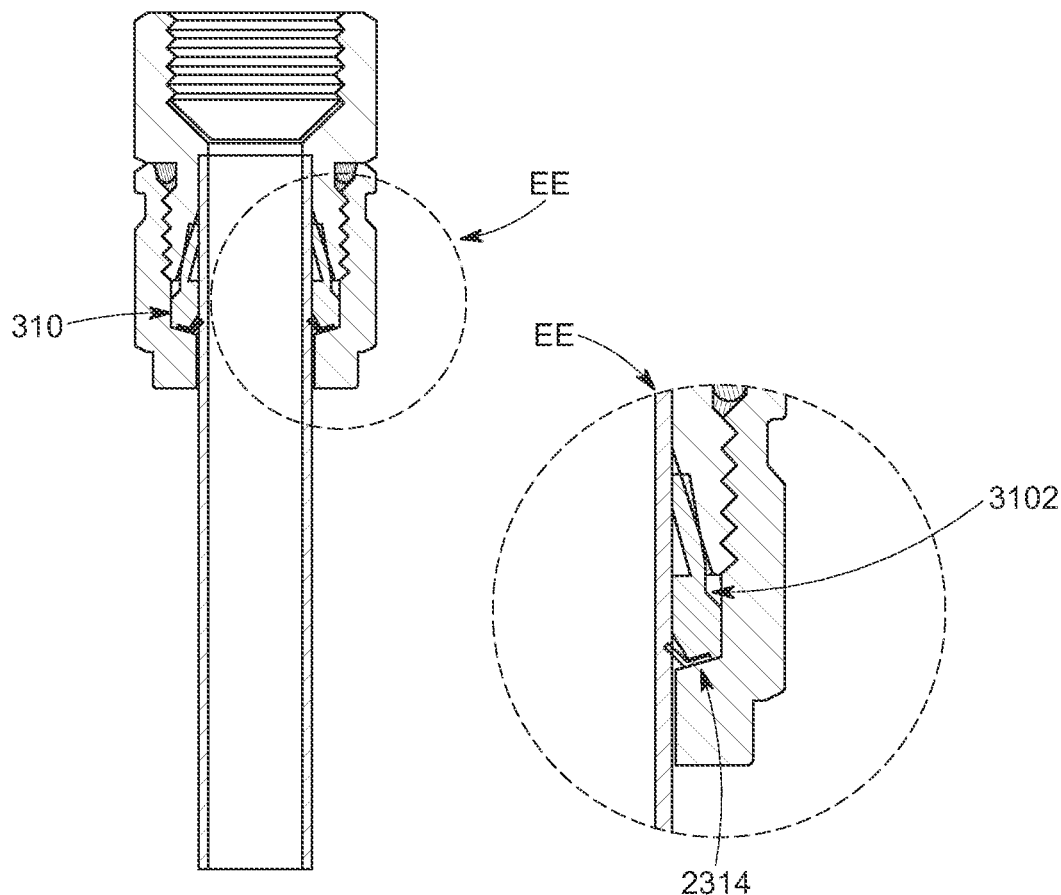
FIG. 3F illustrates press-fitting of a ferrule member and a position locator to obtain the combination ferrule of FIG. 3E, in accordance with an embodiment of the present disclosure.

FIG. 3E illustrates an exploded view of the combination ferrule 310 in accordance with another embodiment of the present disclosure. FIG. 3F illustrates press-fitting of the ferrule member 3102 and the position locator 2308 to obtain the combination ferrule 310 of FIG. 3E, in accordance with an embodiment of the present disclosure. As shown in FIG. 3F, the second fastening means 3104 includes the position locator flange 2314 partially covering the end of the ferrule member 3102. Correspondingly, the second fastening means 3104 further includes a circular groove at the end of the ferrule member 3102, the circular groove being adapted to receive the position locator flange 2314.

Figure 4A:
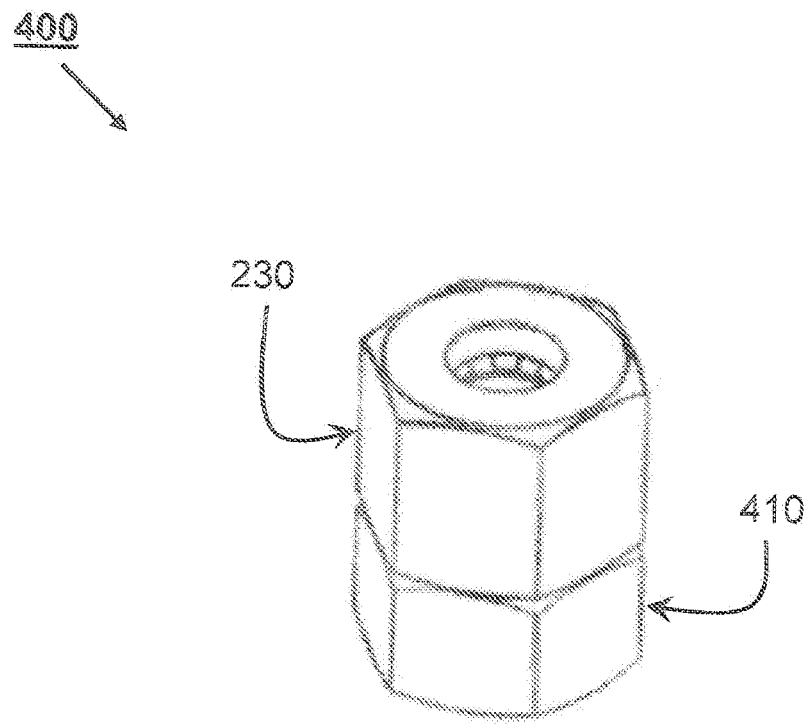
FIG. 4A illustrates an assembly of a tube connector arrangement and a bolt type assembly jig, in accordance with an embodiment of the present disclosure.

FIG. 4A illustrates an assembly of the tube connector arrangement 230 and a bolt type assembly jig 410, in accordance with an embodiment 400 of the present disclosure. The bolt type assembly jig 410 is adapted to fasten the combination ferrule 310 with the tube 210. Further, the bolt type assembly jig 410 is adapted to position the position locator 2308 of the combination ferrule 310 onto the outer tube surface 2106, at the predetermined depth, from the first tube end 2102.

Figure 4B:
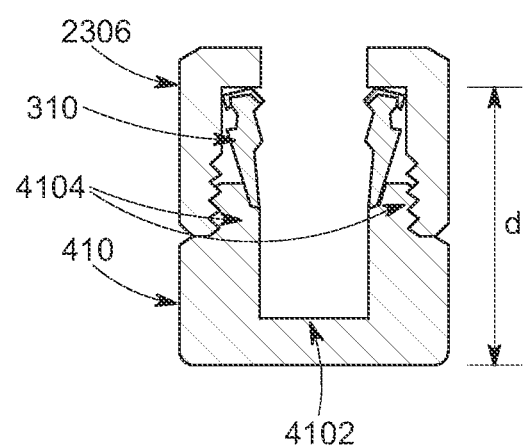
FIG. 4B illustrates a sectional view of the assembly of the tube connector arrangement and the bolt type assembly jig of FIG. 4A, in accordance with an embodiment of the present disclosure.

FIG. 4B illustrates a sectional view of the assembly of the tube connector arrangement 230 and the bolt type assembly jig 410 of FIG. 4A, in accordance with an embodiment of the present disclosure. Further, the bolt type assembly jig 410 is adapted to engage with the compression nut 2306 by means of a plurality of threads provided at the bolt type assembly jig 410, such that when fastened, a shoulder 4102 in a cavity portion of the bolt type assembly jig 410 is at the predetermined depth from the position locator 2308 of the combination ferrule 310. The letter 'd' in FIG. 4B denotes the predetermined depth. This helps in easy placement of the position locator 2308 of the combination ferrule 310 at the predetermined depth onto the outer tube surface 2106, when the tube 210 is inserted through the tube connector arrangement 230. Further, the bolt type assembly jig 410 further comprises one or more extended portions 4104 adapted to receive the ferrule 310 (or ferrules 2302 and 2304) and keep the ferrule 310 in place between along an axis of the bolt type assembly jig 410 between the position locator 2308 and the one or more extended portions 4104. In accordance with an embodiment, the plurality of threads for the bolt type assembly are on the outer surface of the one or more extended portions 4104. According to an embodiment, the one or more extended portions 4104 includes may comprise one or more segments extending upwards from the shoulder 4102 and adapted to be coaxial with the tube 210.

Figure 4C:
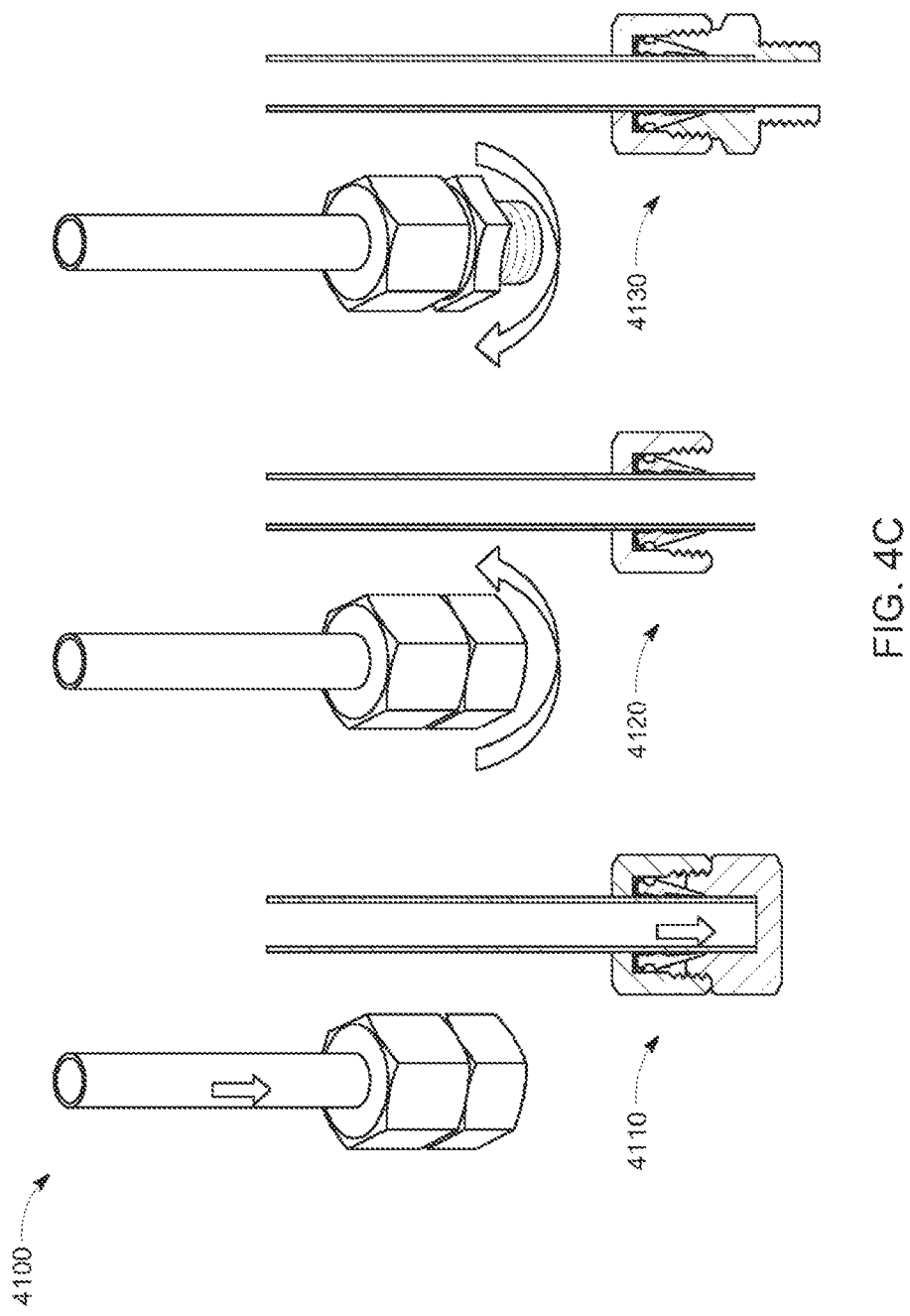
FIG. 4C illustrates a series of visual steps for connecting a tube to a fitting body using the assembly of the tube connector arrangement and the bolt type assembly jig of FIG. 4A, in accordance with an embodiment of the present disclosure.

FIG. 4C illustrates a series of visual steps for connecting the tube 210 to the fitting body 220 using the assembly of the tube connector arrangement 230 and the bolt type assembly jig 410 of FIG. 4A, in accordance with an embodiment 4100 of the present disclosure. At step 4110, the tube 210 is inserted into the tube connector arrangement 230, such that the combination ferrule 310 is located at the predetermined depth from the first tube end 2102. On inserting the tube 210, the combination ferrule 310, is either temporarily or permanently fastened to the outer tube surface 2106 of the tube 210. At step 4120, the bolt type assembly jig 410 is unfastened from the compression nut 2306. At step 4130, the fitting body 220 is fastened to the compression nut 2306, thus completing the assembly between the tube 210 and the fitting body 220.

Figure 5A:
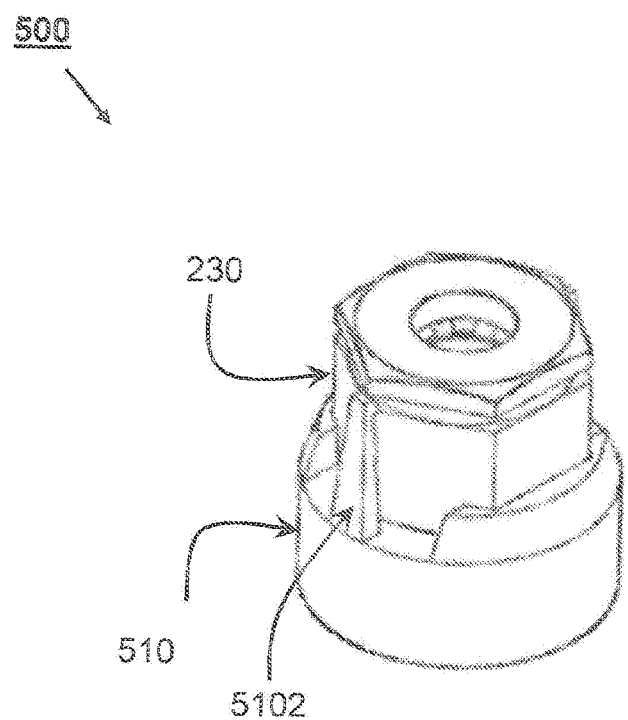
FIG. 5A illustrates an assembly of a tube connector arrangement and a binder type assembly jig, in accordance with an embodiment of the present disclosure.

FIG. 5A illustrates an assembly of the tube connector arrangement 230 and a binder type assembly jig 510, in accordance with an embodiment 500 of the present disclosure. The binder type assembly jig 510 is adapted to fasten the combination ferrule 310 with the tube 210. Further, the binder type assembly jig 510 is adapted to position the combination ferrule 310 onto the outer tube surface 2106, at the predetermined depth, from the first tube end 2102.

Figure 5B:
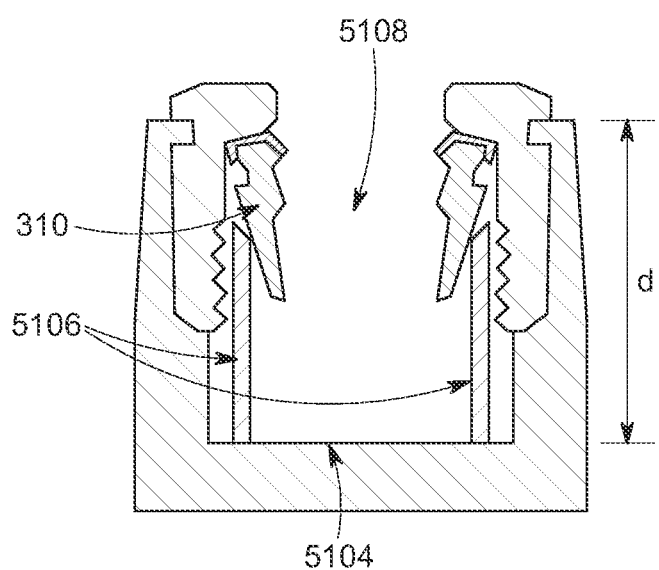
FIG. 5B illustrates a sectional view of the assembly of the tube connector arrangement and the binder type assembly jig of FIG. 5A, in accordance with an embodiment of the present disclosure.

FIG. 5B illustrates a sectional view of the assembly of the tube connector arrangement 230 and the binder type assembly jig 510 of FIG. 5A, in accordance with an embodiment of the present disclosure. Further, the binder type assembly jig 510 is adapted to engage with the compression nut 2306 by means of a plurality of binders 5102 provided at the binder type assembly jig 510 that form a cavity portion 5108, such that when fastened, a shoulder 5104 in the cavity portion 5108 of the binder type assembly jig 510 is at the predetermined depth from the position locator 2308 of the combination ferrule 310. The letter 'd' in FIG. 5B denotes the predetermined depth. This helps in easy placement of the position locator 2308 of the combination ferrule 310 at the predetermined depth at the outer tube surface 2106, when the tube 210 is inserted through the tube connector arrangement 230. Also, the plurality of binders 5102 are easier to unfasten from the compression nut 2306, for example just by pressing the tube 210 against the shoulder 5104. Further, the binder type assembly jig 510 further comprises one or more extended portions 5106 adapted to receive the combination ferrule 310 (or ferrules 2302 and 2304) and keep the combination ferrule 310 in place along an axis of the binder type assembly jig 510 between the position locator 2308 and the one or more extended portions 5106. In accordance with an embodiment, the one or more extended portions 5106 includes one or more segments extending upwards from the shoulder 5104 and adapted to be coaxial with the tube 210.

FIG. 5C illustrates a series of visual steps for connecting the tube 210 to the fitting body 220 using the assembly of the tube connector arrangement 230 and the binder type assembly jig 510 of FIG. 5A, in accordance with an embodiment 5100 of the present disclosure. At step 5110, the tube 210 is inserted into the tube connector arrangement 230, such that the position locator 2308 of the combination ferrule 310 is placed at the predetermined depth from the first tube end 2102. On inserting the tube 210, the combination ferrule 310, is either temporarily or permanently fastened to the outer tube surface 2106 of the tube 210. At step 5120, the binder type assembly jig 510 is unfastened from the compression nut 2306. At step 5130, the fitting body 220 is fastened to the compression nut 2306, thus completing the assembly between the tube 210 and the fitting body 220.

Figure 6:
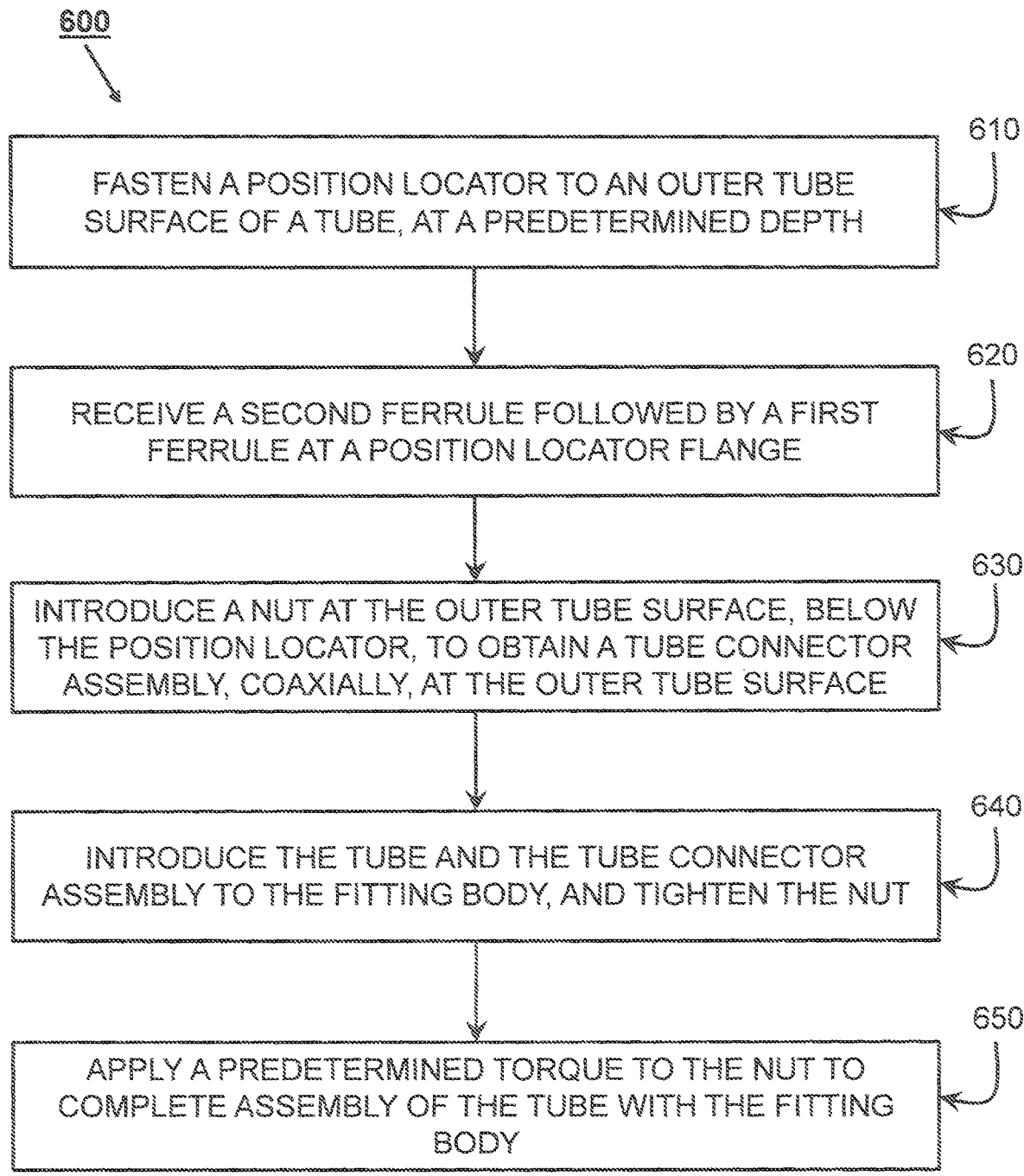
FIG. 6 illustrates a method of assembling a tube with a fitting body, using a tube connector arrangement, in accordance with an embodiment of the present disclosure.

FIG. 6 illustrates a method 600 of assembling the tube 210 with the fitting body 220, using the tube connector arrangement 230, in accordance with an embodiment of the present disclosure. The method 600 begins at step 610 by fastening the position locator 2308 to the outer tube surface 2106 at the predetermined depth. In accordance with an embodiment, the position locator 2308 is fastened using the position locator guide 240. At step 620, the second ferrule 2304 followed by the first ferrule 2302 are received at the position locator flange 2314. At step 630, the compression nut 2306 is introduced at the outer tube surface 2106, below the position locator 2308, to obtain the tube connector arrangement 230, coaxially, at the outer tube surface 2106. At step 640, the tube 210 and the tube connector arrangement 230 are introduced to the fitting body 220 and the compression nut 2306 is tightened using for example, the spanner or the hand. In accordance with an embodiment, the tube 210 and the tube connector arrangement 230 are introduced to the first fitting body end 2202. At step 650, a predetermined torque is applied to the compression nut 2306 to complete the assembly of the tube 210 with the fitting body 220.

Figure 7:
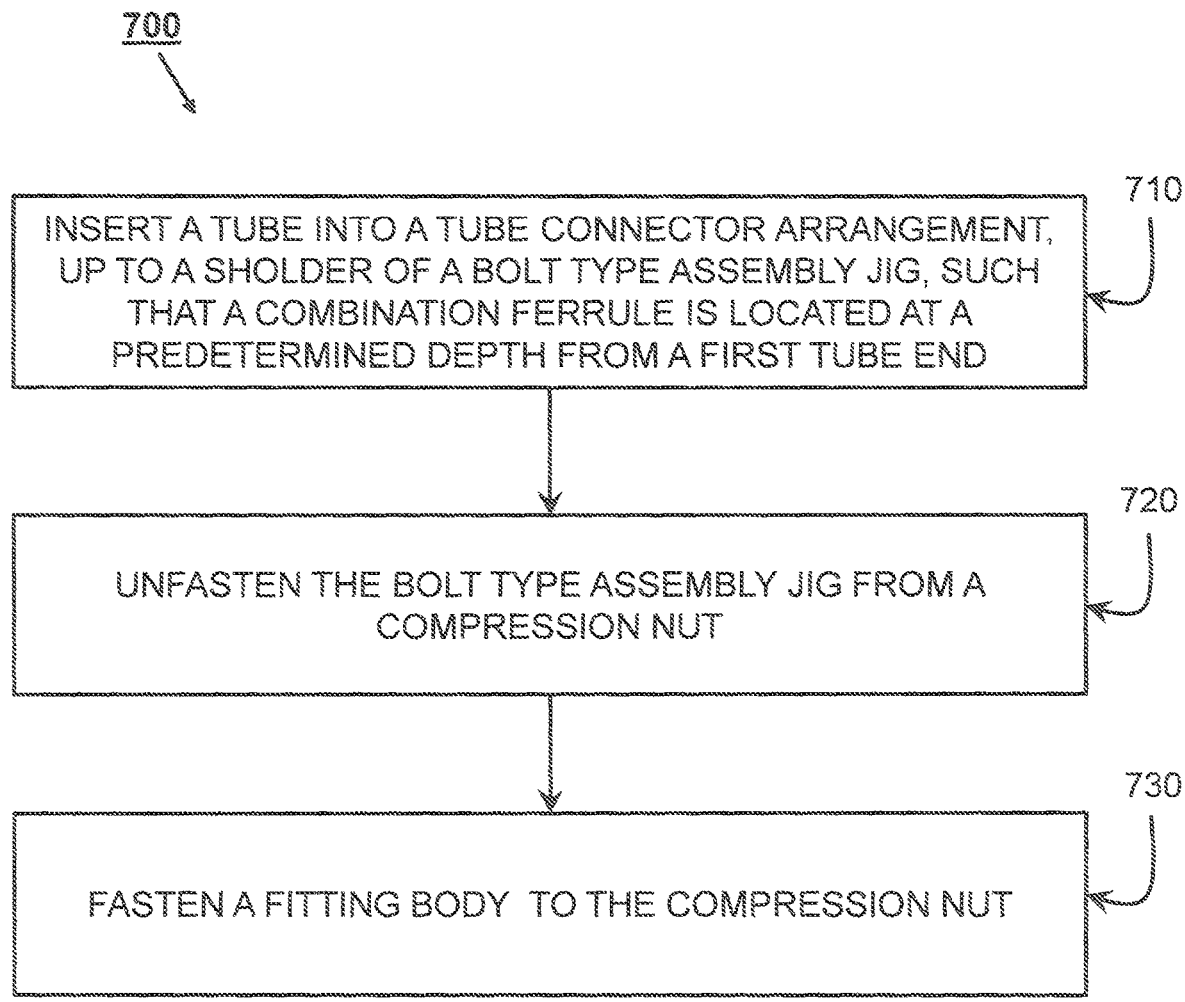
FIG. 7 illustrates a method assembling a tube with a fitting body, using an assembly of a tube connector arrangement and a bolt type assembly jig, in accordance with an embodiment of the present disclosure.

FIG. 7 illustrates a method 700 of assembling the tube 210 with the fitting body 220, using the assembly of the tube connector arrangement 230 and the bolt type assembly jig 410, in accordance with an embodiment of the present disclosure. The method begins at step 710 by inserting the tube 210 into the tube connector arrangement 230, up to the shoulder 4102 of the bolt type assembly jig 410, such that the position locator 2308 of the combination ferrule 310 is located at the predetermined depth from the first tube end 2102. On inserting the tube 210, the combination ferrule 310, is either temporarily or permanently fastened to the outer tube surface 2106 of the tube 210. At step 720, the bolt type assembly jig 410 is unfastened from the compression nut 2306. At step 730, the fitting body 220 is fastened to the compression nut 2306, thus completing the assembly between the tube 210 and the fitting body 220.

FIG. 8 illustrates a method 800 of assembling the tube 210 with the fitting body 220, using the assembly of the tube connector arrangement 230 and the binder type assembly jig 510, in accordance with an embodiment of the present disclosure. At step 810, the tube 210 is inserted into the tube connector arrangement 230, up to the shoulder 5104 of the binder type assembly jig 510, such that the position locator 2308 of the combination ferrule 310 is located at the predetermined depth from the first tube end 2102. On inserting the tube 210, the combination ferrule 310, is either temporarily or permanently fastened to the outer tube surface 2106 of the tube 210. At step 820, the binder type assembly jig 510 is unfastened from the compression nut 2306. At step 830, the fitting body 220 is fastened to the compression nut 2306, thus completing the assembly between the tube 210 and the fitting body 220.

The present disclosure provides a number of advantages. First since, the position locator 2308 or the combination ferrule 310 are either temporarily or permanently fastened to the outer tube surface 2106, the first ferrule 2302 and the second ferrule 2304 are not displaced from their positions in a direction opposite to the assembly the tube 210 with the fitting body 220. Further, the combination ferrule 310 ensures that minimal number of parts are used, thus overall cost is reduced and a possibility of parts getting misplaced is minimized. Further, the position locator guide 240 allow the position locator 2308 to be accurately located along the outer tube surface 2106. Also, the bolt type assembly jig 410 and the binder type assembly jig 510 allow the combination ferrule 310 to be accurately located along the outer tube surface 2106.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claim.

I claim:

1. A method comprising:
    fastening a position locator to an outer surface of a tube at a predetermined depth from a first end of the tube such that at least one ferrule abuts a flange of the position locator between the first end of the tube and the position locator;
    forming a tube connector assembly by introducing a compression nut such that an inner wall of the compression nut surrounds the position locator and the at least one ferrule;
    introducing a fitting body via the first end of the tube; and
    fastening the tube connector assembly to the fitting body using a first threading on the inner wall of the compression nut and a second threading on an outer wall of the fitting body such that the at least one ferrule is between the compression nut and the fitting body,
    wherein fastening the position locator to the outer surface of the tube comprises:
        coaxially introducing the position locator to the first end of the tube;
        inserting the first end of the tube into an elongate portion of a position locator guide until the first end of the tube abuts a cap of the position locator guide such that the position locator is pushed along the outer surface of the tube for the length of the elongate portion, the length of the elongate portion being equivalent to the predetermined depth; and
        removing the tube from the position locator guide.

2. The method of claim 1,
    wherein forming the tube connector assembly comprises temporarily fastening the compression nut to a hollowed out portion of an assembly jig comprising at least one extended portion such that one of the at least one ferrule is held in place by the at least one extended portion, the hollowed out portion being wide enough to allow the tube to pass through and a shoulder portion at an opposite end that prevents the tube from passing through, and
    wherein fastening the position locator to the outer surface of the tube comprises:
        inserting the first end of the tube into the tube connector assembly until the first end of the tube abuts the shoulder portion of the assembly jig; and
        unfastening the assembly jig from the tube connector assembly.

3. The method of claim 2, wherein when the tube connector assembly is fastened to the assembly jig, a distance between the shoulder portion of the assembly jig and the position locator is equivalent to the predetermined depth.

4. The method of claim 2, wherein the assembly jig comprises a bolting assembly jig, wherein the outer surface of the hollowed out portion is threaded to be temporarily fastened to the first threading on the inner wall of the compression nut.

5. The method of claim 2, wherein the assembly jig comprises a binding assembly jig comprising a plurality of binders such that unfastening the assembly jig from the tube connector assembly comprises pressing the tube against the shoulder portion of the binding assembly jig.

6. The method of claim 1, wherein the tube connector assembly is formed before the position locator is fastened to the outer surface.

* * * * *